INVENTORS:
J.R. DOZIER
B.L. GOEPFERT
H.L. SHATTO, JR.
BY Theodore E. Bieber
THEIR ATTORNEY INVENTORS:
J. R. DOZIER
B. L. GOEPFERT
H. L. SHATTO, JR.
BY: Theodore E. Bieber

THEIR ATTORNEY 3,154,854
SHIP CONTROL APPARATUS
Howard L. Shatto, Jr., Palos Verdes, James Ronald Dozier, Whittier, and Benjamin L. Goepfert, West Covina, Calif., assignors to Shell Oil Company, New York, N.Y., a corporation of Delaware
Filed Oct. 6, 1961, Ser. No. 143,319
5 Claims. (Cl. 33—1)

This invention pertains to ship control apparatus and more particularly to an apparatus for mounting a tiltmeter to sense the angular deflection of the guide line.

In the copending application of Howard L. Shatto, Jr., and J. Ronald Dozier, entitled "Ship Control System," Serial No. 95,601, filed March 14, 1961, there is described a system for controlling a floating vessel to maintain it dynamically positioned over a desired location or maneuver it along a desired course. This copending application utilizes information obtained from a tiltmeter means that senses the angular deflection of a taut line or guide line extending from the vessel to the desired location on the ocean floor. In sensing the angular deflection of the taut line several problems arise, for example, the tiltmeter cannot load the line for any load will cause the line to deflect and the measured deflections will not represent the true displacement of the vessel from the desired location. Also, it is necessary to prevent rotation of the tiltmeter about its vertical axis. This is necessary to properly orient the output signal from the tiltmeter with respect to the athwartship and longitudinal axes of the vessel. Furthermore, the tiltmeter is preferably not mounted integrally with the guide line in order that it may be maintained out of the water as the guide line is retrieved or paid out to maintain the proper tension thereon.

Accordingly, it is the principal object of this invention to provide a novel system for measuring the angular deflection of a vessel from a desired location on the floor of a body of water using a taut line and tiltmeter.

It is another object of this invention to provide a novel mounting means for a tiltmeter that will sense the angular deflection of a taut guide line without imposing a load on the guide line.

A further object of this invention is to provide a novel mount for a tiltmeter that is disposed to sense the angular deflection of the taut guide line and in addition maintain the tiltmeter in a predetermined orientation or alignment with respect to the athwartship and longitudinal axes of the vessel.

The above objects and advantages of this invention are achieved by anchoring the guide line to the floor of a body of water at a known or predetermined location. The guide line is then passed over supporting sheaves mounted on the vessel and attached to a reel means or winch on the vessel. The guide line is maintained under a constant tension force by a slipping clutch arrangement on the winch or other constant tension devices.

The angular deflection of the guide line is sensed by a tiltmeter which is mounted on a support that pivots or rotates about the axis of the sheave supporting the guide line. In addition, the tiltmeter support is pivoted for rotation about a second axis that is perpendicular to the axis of the supporting sheave and intercepts the sheave axis. The tiltmeter support follows the direction of the guide line by means of an arm which extends therefrom and is provided with two spaced sheaves at its end. The sheaves are laterally spaced a distance sufficient to permit the guide line to pass through the opening between the two sheaves. Other following means, such as a guide tube could also be used. To insure that the tiltmeter and its support does not impose a load on the guide line the center of gravity of the tiltmeter and its associated support is adjusted until it substantially coincides with the intersection of the two axes.

The above objects and advantages of this invention will be more easily understood from the following detailed description of a preferred embodiment when taken in conjunction with the attached drawing, in which.

Figure 1:
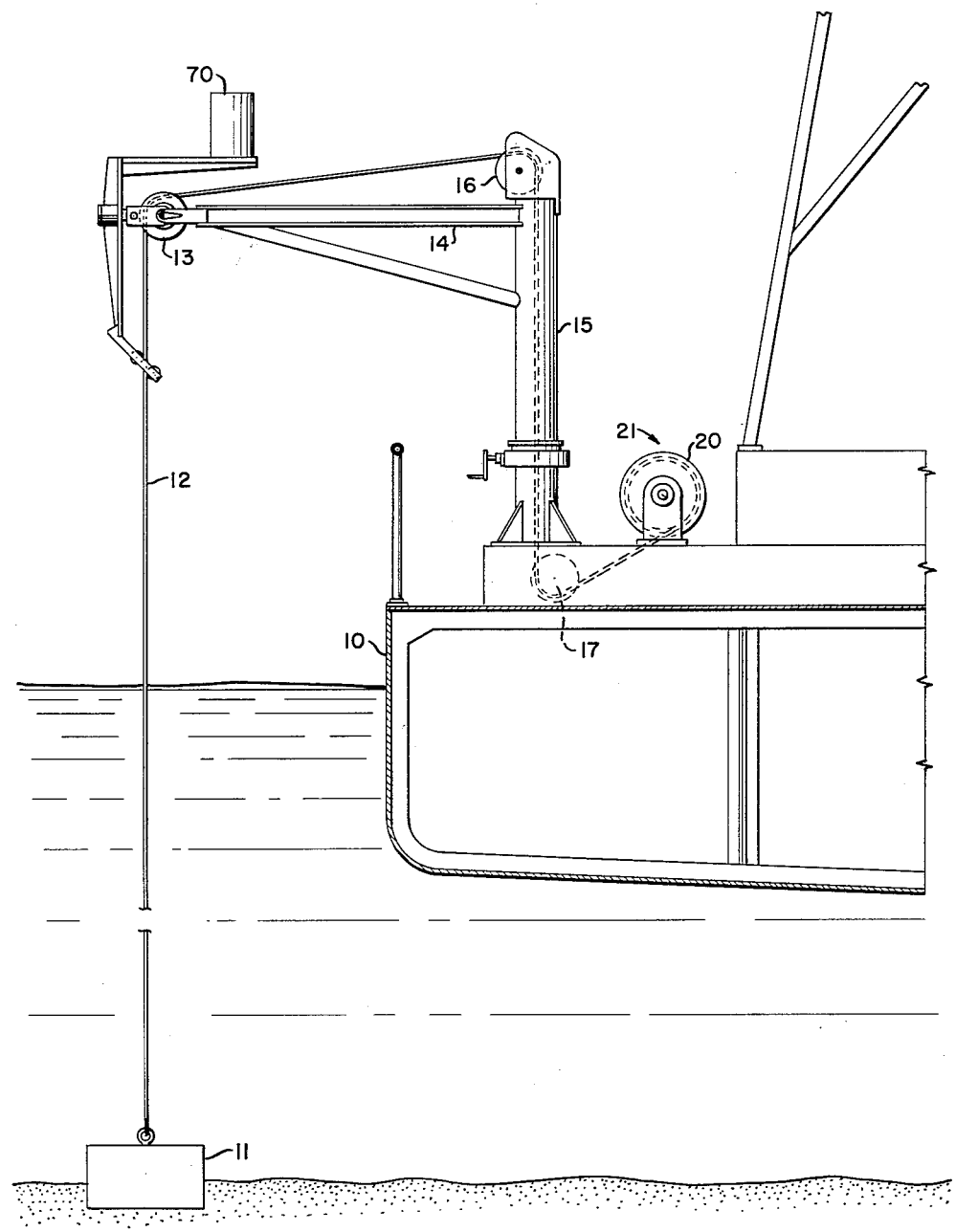
FIGURE 1 is an athwartship section of a floating vessel showing the tiltmeter and tiltmeter mounting means for sensing the angular deflection of the guide line.

Referring now to FIGURE 1, there is shown a floating vessel 10 which is to be maintained over a desired location by means that utilize the displacement information obtained by sensing the angular deflection of a taut guide line. The guide line is anchored to the desired location or at a known position at one end by an anchor or weight 11 and has its other end secured to the vessel. The guide line passes upwardly over a supporting sheave 13 that is mounted on the end of a rotatable boom member 14. The boom member 14 is supported at its end opposite the sheave 13 by a pivot post 15 whose lower end is securely attached to the deck of the vessel 10. In addition, the pivot post 15 should be secured or stayed in order to maintain it substantially normal to the deck of the vessel. The guide line extends towards the pivot post 15 where it passes over a sheave 16 that is secured to the pivot post 15. The guide line then passes downwardly to a sheave 17 and then led to the drum 20 of a winch 21. The winch 21 is provided with a drive means that includes a constant tensioning means as for example an eddy current coupling, air motor or air cylinder in order that it may maintain a constant tension on the guide line 12.

From the above description, it can be appreciated that the winch 21 will maintain a constant tension on the guide line 12. As the vessel moves or is displaced the winch 21 will reel in or reel out the guide line 12 to maintain a constant tension thereon. The above system thus insures that the guide line will always be maintained under a substantially constant tension and in a taut condition regardless of the movement of the vessel 10.

Figure 2:
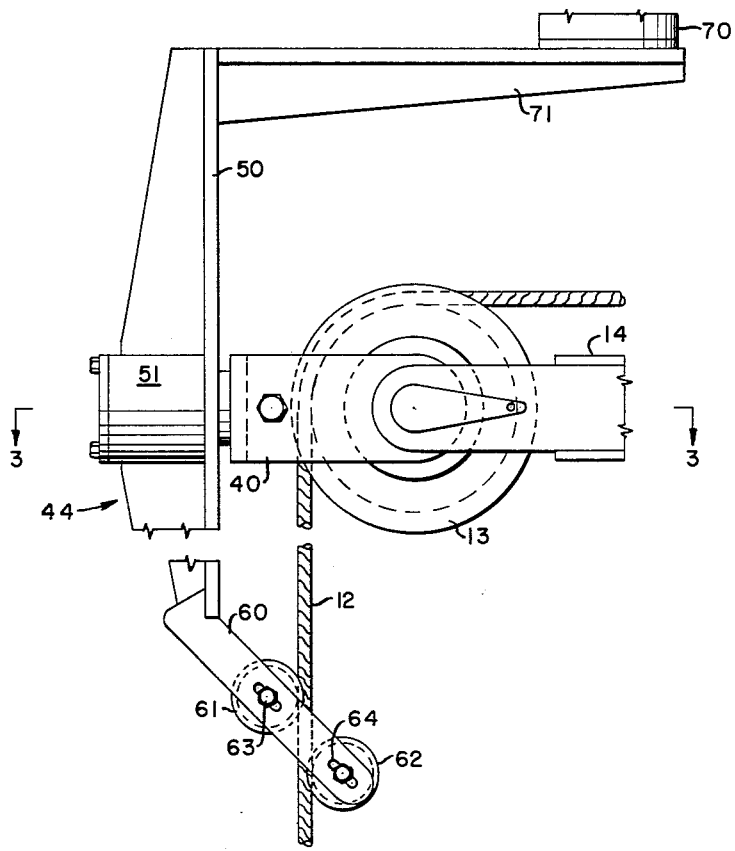
FIGURE 2 is one partial elevation view of the tiltmeter and its supporting member taken in a direction substantially parallel with the athwartship direction; and, FIGURE 3 is a section taken along line III—III of FIGURE 2 and showing the pivotal axes of the tiltmeter support.
Figure 3:
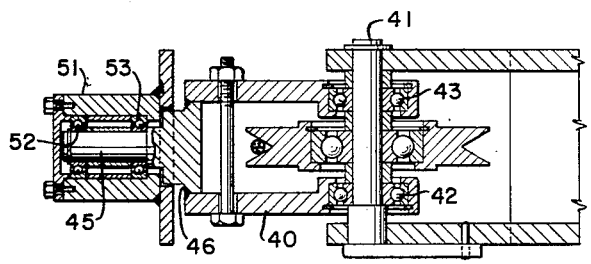

Referring now to FIGURES 2 and 3, there is shown the detailed construction of the mounting means for the tiltmeter. The mounting means has a U-shaped bracket 40 whose legs are pivotally mounted on the pin 41 that supports the sheave 13. The bracket 40 is supported on the pin 41 by ball bearings 42 and 43. A support member 44 is pivotally supported on a shaft 45 that extends from the free end or bight portion of bracket 40. The support member 44 is formed from a T-shaped member 50 having a tubular section 51 fastened to its center section as by welding or the like. The tubular section 51 receives ball bearings 52 and 53 that support the member 44 on the shaft 45. It should be noted that the axis of the shaft 45 is at right angles to the axis of the pin 41 and in addition intersects the axis of the pin 41.

Two plate members 60 extend downwardly and to the right in FIGURE 2 from the support member 44, the plates 60 being secured to a member 44 by welding or the like. The two plate members 60 are spaced to receive sheaves 61 and 62 that are provided with adjustable axes by means of slots 63 and 64 formed in the plate members 60. From FIGURE 2 it can be seen that the plate members 60 extend to the right a sufficient distance to permit the sheaves to be adjusted to align the axis of the opening between the sheaves tangent to the pitch diameter of the sheaves 13. The guide line 12 passes over the sheave 13 and then downwardly between the two sheaves 61 and 62 as shown in FIGURE 2.

The tiltmeter 70 is secured to the end of an arm 71 that extends from the upper end of the support member 44. The tiltmeter 70 may be of various designs but is preferably of the type described and claimed in the copending application of Kenneth W. Foster, entitled "Position Locating Device," Serial No. 830,604, filed July 30, 1959, now Patent No. 3,121,954, issued February 25, 1964. The tiltmeter described in the copending application utilizes two potentiometers that are disposed at substantially right angles to each other in a gimbal mount. A pendulum is attached to the gimbal to position the wiper arms of the two potentiometers in response to the inclination of the tiltmeter housing. The tiltmeter 70 is located to adjust the center of gravity of the combination of tiltmeter and supporting means to coincide with the intersection of the axis of shaft 45 and pin 41.

From the above description it is apparent that the tiltmeter will pivot in two directions at right angles to each other about axes that are aligned with the pivot pin 41 and the shaft 45. In addition, the center of gravity of the complete assembly coincides with the intersection of these axes.

When the system shown in FIGURE 1 is operated the boom 14 is rotated with the pivot post 15 until it extends outwardly from the side of the vessel 10 and is aligned substantially athwartships. When the vessel rolls the tiltmeter support will pivot about the axis of pin 41 and when the vessel pitches the tiltmeter support will pivot about the axis of shaft 45. Accordingly, the potentiometer in the tiltmeter 70 which responds to athwartship displacement of the vessel should be aligned with the plane of FIGURE 2 while the potentiometer that responds to longitudinal displacement of the vessel should be aligned in a plane normal to the plane of FIGURE 2. Once the potentiometers in the tiltmeter are properly aligned and the tiltmeter secured to the support, the potentiometers will maintain their proper orientation with respect to the vessel 10 regardless of the direction in which the guide line 12 is extending.

Of course, it should be appreciated that while the tiltmeter and its support always pivots purely about the axis 41 and thus provides a true reading of the angular deflection of the guide line 12 in an athwartship plane it does not respond with absolute accuracy in the longitudinal plane. This can be readily appreciated from an inspection of FIGURES 2 and 3. If greater accuracy is required in the longitudinal plane it can be provided by pivoting the supporting member for the sheave 13 so that it pivots about the same axis as the shaft 45. This is normally not required since only a small degree of error is introduced by not pivoting the support member for sheave 13. Furthermore, as the guide line 12 assumes a more vertical position the error caused by the above described movement will decrease and completely disappear when the guide line 12 is in a vertical position.

Since the combination of tiltmeter and its mounting means is adjusted so that its center of gravity falls on its pivot point the tiltmeter will not impose a load or deflection on the guide line 12 regardless of its position. In addition, the use of the two sheaves 61 and 62 provides simple means by which the tiltmeter will be subjected to the same angular deflection as the guide line 12 and yet permit the guide line 12 to freely pass through the two sheaves. This is an important feature of this invention since it provides a means for the tiltmeter and its support means to follow the direction of the guide line so that it may respond to the deflection thereof while maintaining free passage of the guide line through the following means.

While but one embodiment of this invention has been described in detail, many changes and improvements may be made thereto. Accordingly, this invention should not be limited to the details described herein but only to its broad spirit and scope.

We claim as our invention:

1. A mounting device for a tiltmeter disposed to sense the angular deflection of a taut line in two planes at a predetermined angle to each other, said mounting comprising: a bracket disposed to pivot about a first axis at one end, the other end of said bracket extending from said first axis; a support member pivotally mounted on said other end of the bracket for rotation about a second axis at right angles to and intersecting said first axis, one end of said support member extending in the opposite direction of said bracket over said first axis; a mounting means disposed on said one end of said support member for said tiltmeter; the other end of said support member extending in a direction substantially normal to the plane of said first and second axes; engaging means disposed on the other end of said support member and adapted to contact said taut line and said tiltmeter being disposed a sufficient distance on one side of said first axis to cause the center of gravity of said mounting device to fall on the intersection of the two axes.

2. A mounting device for a tiltmeter disposed to sense the angular deflection of a taut line that is anchored at one end and then passes over a support sheave and extends to a tensioning device, said mounting device comprising: a bracket having one end pivotally mounted to permit said bracket to rotate about the axis of said support sheave; a support member having one end pivotally mounted at the other end of said bracket to permit said support member to rotate about an axis normal to and intersecting the axis of said support sheave; one end of said support member extending in the opposite direction as said bracket, a mounting means for said tiltmeter being disposed on said one end of the support member; the other end of said support member extending in the direction of the portion of said taut line whose deflection is to be determined; a pair of sheaves rotatably mounted on said other end of the support member, the axes of said sheaves being spaced to permit the taut line to pass therebetween; and said tiltmeter being disposed on said mounting means a sufficient distance on one side of the axis of said support sheave to balance the combination of said tiltmeter and said support member about the intersection of the two axes.

3. A system for measuring the angular displacement of a vessel from a desired location, said system comprising: a guide line having one end anchored below the desired location of the vessel, the other end of said line passing over a support sheave disposed on said vessel and being secured to a tension means disposed on the vessel, said tension means maintaining a constant tension on said guide line; a tiltmeter support pivotally mounted to rotate about the axis of said support sheave and a second axis at a right angle thereto and intersecting the axis of said sheave, a tiltmeter disposed on said support, the center of gravity of said tiltmeter and tiltmeter support being at the intersection of the said axes; and engaging means disposed on the tiltmeter support to engage the portion of said guide line between said anchored end and said vessel and position said tiltmeter to substantially align it with said guide line.

4. A mounting device for a tiltmeter disposed to sense the angular deflection of a taut line that is anchored at one end and then passes over a support sheave and extends to a tensioning device, said mounting device comprising: a U-shaped bracket having its legs pivotally mounted on the axis of said sheave; a stub shaft extending from the bight portion of said U-shaped bracket, the axis of said stub shaft being normal to the axis of said sheave and in addition intersecting the axis of said sheave; an elongated support member pivotally mounted on said shaft and extending in opposite directions therefrom; a pair of sheaves mounted on one end of said support member and spaced to permit the taut line to pass between and be engaged by said sheaves; the other end of said support member being provided with a portion that extends over the axis of said sheave and substantially parallel to the axis of said stub shaft; a mounting means being provided on said portion of the support member for receiving the tiltmeter, the tiltmeter being positioned on the mounting means to cause the center of gravity of the mounting device and tiltmeter to coincide with the intersection of the axis of said sheave and the axis of said shaft.

5. A mounting device for a tiltmeter disposed to sense the angular deflection of a taut line in two planes at a predetermined angle to each other, said mounting comprising: a first bracket disposed to pivot about a first axis; a second bracket disposed on said first bracket to pivot about a second axis normal to and intersecting said first axis; an engaging means disposed on said second bracket and adapted to contact said taut line and mounting means on said second bracket for receiving said tiltmeter, said tiltmeter being positioned on said mounting means with respect to the intersection of said first and second axes to cause the center of gravity of said mounting device and tiltmeter to coincide with the intersection of said first and second axes.

References Cited in the file of this patent

UNITED STATES PATENTS

| | | |
|---|---|---|
| 528,600 | Kirtland | Nov. 6, 1894 |

FOREIGN PATENTS

| | | |
|---|---|---|
| 9,969 | Great Britain | 1885 |
| 4,809 | Great Britain | 1901 |